Jan. 6, 1970  B. E. RAGAN  3,487,868
RENEWED HEAVY-DUTY TIRE
Filed March 1, 1967
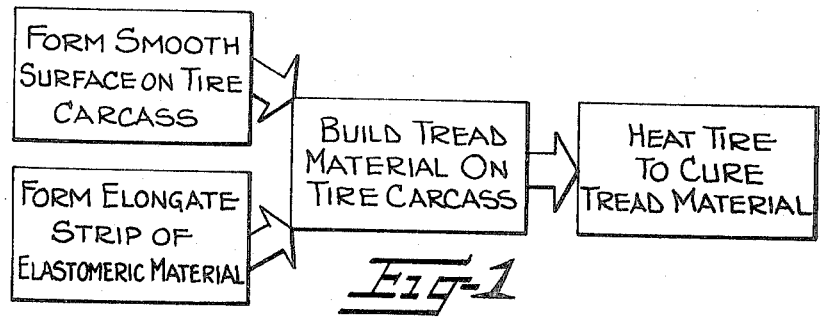
Fig-1
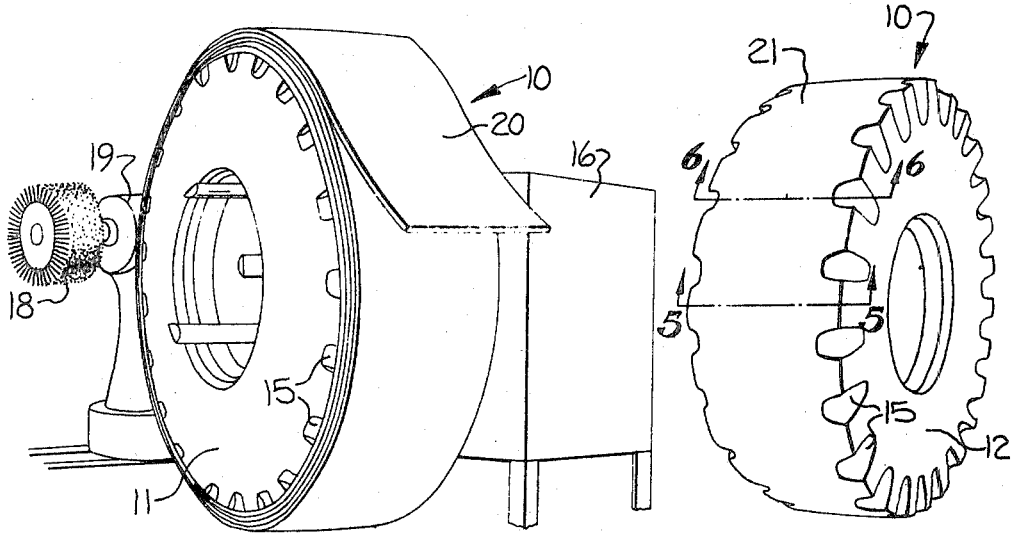
Fig-2   Fig-3
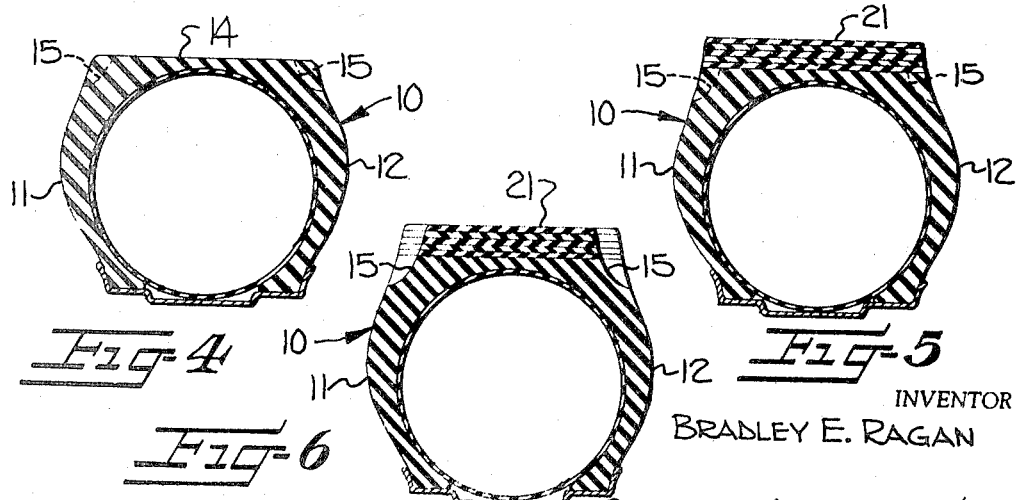
Fig-4   Fig-5
Fig-6
INVENTOR:
BRADLEY E. RAGAN
BY Parrott, Bell, Seltzer, Park & Heard
ATTORNEYS

United States Patent Office 3,487,868
Patented Jan. 6, 1970

3,487,868
RENEWED HEAVY-DUTY TIRE
Bradley E. Ragan, Spruce Pine, N.C., assignor to Brad Ragan, Inc., Spruce Pine, N.C., a corporation of North Carolina
Filed Mar. 1, 1967, Ser. No. 619,659
Int. Cl. B60c 11/00
U.S. Cl. 152—209                                   1 Claim

ABSTRACT OF THE DISCLOSURE

A renewed heavy duty tire having an exteriorly smooth tread surface composed of a plurality of circumferential wrappings of a uniform tread renewal material dimensioned axially so as to extend across the exterior of the carcass from sidewall to sidewall.

---

One application of commercially available inflatable rubber earthmover tires, such as sizes 11.00 x 20 or larger tires having lugged treads thereon, in which an extremely high dollar cost per hour of use has been heretofore accepted as typical has been the operation in a quarry of a rubber tired tractor having a material handling bucket or bulldozer blade. Such tractors, known as loaders or loader-dozers, are relatively slow moving as compared to motor graders and other rubber tired earthmoving vehicles and are operated on relatively level and substantially solid surfaces. As can be understood, this application does not require lugged tread tires for traction, as the vehicles do not traverse steep grades, inclines or muddy surfaces, or for the dissipation of heat, as the vehicles are not capable of the relatively high speeds which cause tire heating. The significantly shorter operating life of such tires in this application, as compared to more usual application, principally results from cutting of the tread lugs, separation of cut lugs from the carcass of the tire, and abrasion of the remaining tread material as a loader is repeatedly driven back and forth over a short distance in an area where rock is beig loaded, and thus traversed over sharp rock fragments. These factors shorten the life of both renewed or retreaded and new tires alike, but are particularly apparent with renewed tires.

It has been discovered that, due to the relatively heavy loading of such a vehicle and the other factors discussed above, a smooth tread tire having a large surface contact area or footprint will provide adequate traction, avoid lug cutting and separation by being free of such projections, and remain sufficiently cool in use in any application such as that described above. However, no such tire has been available heretofore, either as a new tire or as a renewed tire, principally due to limitations imposed by the large size of the tires in question and the known methods of forming treads on such tires. In order to permit insertion of a tire carcass and tread of the size involved into a mold for vulcanization of the tread surface of the tire, the tread surface is configured to generally conform to the transversely curved exterior toroidal surface of the carcass. Such a surface does not permit obtaining the large footprint possible with a right circular cylindrical configuration, but no method has heretofore been proposed by which such a surface may satisfactorily be built on a large size tire, and therefore such tires have not been available. This is particularly true as to methods for the renewal of such tires and as to renewed tires of these sizes.

With the aforementioned difficulties and deficiencies in production of heavy-duty tires particularly adapted for mounting on a loader operated in a quarry specifically in mind, it is an object of the present invention to provide a method of forming a tread on a tire carcass which imparts to the tread characteristics particularly facilitating an extended tire operational life in such an application. In realizing this object, the method of this invention proceeds by removing worn tread face material from a previously used tire carcass to form thereon a smooth exterior surface, forming an elongate strip of uncured elastomeric material, building a body of uncured tread material on the smooth surface of the tire carcass by applying thereto the elongate strip of uncured elastomeric material, and curing the body of tread material as built on the tire carcass. The formation of the smooth exterior surface on the tire carcass and building of the body of uncured tread material on the tire carcass are so conducted as to produce a tire having a large surface contact or footprint area and which is free from any projections which could be damaged by rock cuts and thus separated from the tire tread.

A further object of the present invention is to provide a renewed heavy-duty tire characterized by having a tread thereon which facilitates the achievement of a long operational life for the renewed tire when mounted on a tractor and operated in a quarry environment as described above. The enhanced operational life of the renewed tire of the present invention is facilitated both by the particular tread construction thereon and by the maintenance of the sidewalls of the tire carcass included in the renewed tire substantially in the condition present before renewal of the tire, as described more fully hereinafter.

Some of the objects and advantages of the invention having been stated, others will appear as the description proceeds, when taken in connection with the accompanying drawings, in which—

FIGURE 1 is a diagrammatic representation of the steps of the method of this invention;

FIGURE 2 is a perspective view of a heavy-duty tire carcass and certain apparatus at one step in the method of this invention;

FIGURE 3 is a perspective view of a heavy-duty tire and tread formed in accordance with the method of this invention;

FIGURE 4 is an enlarged section view through a tire carcass at one step in the method of this invention;

FIGURE 5 is an enlarged section view through the tire of FIGURE 3, taken substantially along the line 5—5 in FIGURE 3; and FIGURE 6 is a view similar to FIGURE 5, taken substantially along the line 6—6 in FIGURE 3.

Referring now more particularly to the drawing, the building of a heavy-duty tire tread in accordance with the method of this invention proceeds step-by-step generally from left to right of the diagrammatic representation of FIGURE 1. While FIGURE 1 is intended to briefly represent the successive steps undertaken in this method, it is believed that a better understanding of the method, may be obtained by a description given with reference to a renewed tire, such as the tire indicated generally at 10 (FIGURES 2 and 3), at progressive stages in the building of a tread thereon.

Conventionally, the carcass of the tire 10 includes sidewalls 11 and 12 which define shoulder portions of the tire and an external face of the carcass therebetween (FIGURES 4–6). Inasmuch as this invention contemplates that the carcass of the tire 10 shall be a previously used carcass, and those carcasses which are generally available have been initially constructed with lugged tread configurations thereon, the tire 10 is shown as including the shoulder reliefs or concavities 15 typical of a lugged tread configuration.

In proceeding to form on the carcass of the tire 10 a tread having the desired characteristics discussed above, and thereby form a renewed tire as comprehended by this invention, the tire carcass is first formed to have a smooth exterior surface 14 (FIGURE 4) which has a generally right circular cylindrical configuration. The smooth surface 14 preferably is formed by buffing the carcass of the tire 10 to remove worn tread face material therefrom, and such buffing may be done by mounting the tire 10 on a suitable support 16 (FIGURE 2) for rotation adjacent a buffing wheel 18 driven by a motor 19. Such an apparatus is conventional and is not critical to the practice of this method. It is, however, important that the tire carcass have formed thereon a smooth exterior surface which has a generally right circular cylindrical configuration and which is clean and free from dirt or grease, so that the carcass is properly prepared for the further steps in the method of this invention.

In order to avoid disturbing the tire flexure characteristics initially chosen by the tire designer, and thereby contribute to increasing the useful life of the renewed tire by avoiding unwarranted strain on the carcass construction, it is preferred that the smooth exterior surface 14 be formed by buffing the tread face of the carcass without disturbing the sidewall portions 11, 12 thereof. This is to be contrasted with the usual practice of buffing the sidewalls where a conventional recap of a tire is to be accomplished and wherein a camelback preform includes both sidewall portions and a crown portion.

In order to provide a tread surface for the tire 10 which has a large footprint area and is free from projections which will otherwise be lost as a result of rock cuts, this invention provides that uncured elastomeric material be formed into an elongate strip, a body of uncured tread material be built on the tire carcass using the elongate strip of uncured elastomeric material, and that the body of tread material be cured to form the tread surface. More particularly, an elongate strip 20 of uncured elastomeric material, such as a rubber compound prepared for use in retreading or renewing heavy-duty tires of the type with which this invention is concerned, is formed to have a generally rectangular cross-sectional configuration and a width substantially greater than the thickness thereof, which width has a predetermined correlation to the width of the smooth exterior surface 14. The width of the formed strip 20 of elastomeric material may be equal to the width of the exterior surface 14 of the tire 10, or may be some predetermined fractional portion of that width to permit building up a body of uncured tread material on the carcass by a choice of lays as described more fully hereinafter.

In forming uncured elastomeric material into the strip 20 used in accordance with this method, it is preferred to extrude the material through an extruder such as that described in United States Patent No. 2,958,098, which permits an operator rebuilding tire treads to substitute removable dies and readily extrude stock of the requisite size for any given size of tire being processed. Additionally, such extrusion at the point of use permits prompt severance of a length of the strip 20 for stitching to the exterior surface 14 of the tire 10 while the severed portion is substantially at the extrusion temperature. The extrusion temperature preferably is in excess of 150° F., usually being approximately 170° F., and stitching substantially at this temperature promotes a more uniform and adhesive bond between the cured and uncured rubber than would be obtained at a lower bonding surface temperature. Due to the higher temperature, the more suitable characteristics of freshly extruded rubber and the large surface area available for bonding, the resulting join approaches the strength of a unitary block of one of the joined rubber materials.

In order to build up a body of uncured tread material on the carcass of the tire 10, either of two lay-up or building processes may be followed. More particularly, one end of a substantial length of strip material 20 may be skived or tapered, and the length then stitched to and wound about the smooth exterior surface 14 of the tire 10 in a plurality of successive convolutions, with the outer end of the strip similarly skived and overlapped with the innermost end of the strip. Alternatively, a plurality of portions may be successively severed from a length of the material 20, with each portion having a length corresponding to the then circumference of the exterior surface as the body of material is being built up (FIGURES 2, 5 and 6). Regardless of the building process followed, the body 21 of uncured tread material is built to have a predetermined radial thickness (FIGURES 5 and 6) which is substantially uniform across the width of the smooth surface and throughout the circumferential extent thereof, in order that the body 21 of uncured tread material will define a smooth outer face having a substantially right circular cylindrical configuration. After the body 21 of uncured tread material has been built-up on the carcass of the tire 10, the edges thereof are scalloped in coordination with any underlying sidewall and shoulder reliefs 15 which were part of a previous lug tread (FIGURES 3 and 6). In order to further assure that the flexure characteristics designed into the carcass of the tire 10 are not changed by the building of a tread thereon, the body 21 of tread material is built up while the sidewalls 11, 12 are maintained free of the accretion of additional rubber.

While it is preferred to stitch the formed strip 20 of uncured elastomeric material to the cured rubber of the carcass of the tire 10 while the strip material 20 is near the extrusion temperature, it has been found that the large area of surface contact obtained therebetween permits obtaining a bond of substantially the same strength even when the strip stock has been permitted to cool, provided that certain procedures are followed. In order to obtain a strong bond between relatively cool strip stock and a cured rubber carcass while avoiding the introduction of a plane of weakness in the tire, the surfaces to be adhered are wiped with a rubber solvent and afterward coated with a thin layer of a heavy-duty rubber cement such as Goodyear's Nylo-Bond. After the carrier for the cement has evaporated, the strip stock is positioned encircling the carcass and stitched into place.

Subsequent to the formation on the carcass of the tire 10 of the body 21 of tread material which defined a substantially right circular cylindrical exterior surface and thus has a large footprint area, the tread material is cured by being subjected to suitable temperatures and pressures for a required time, as generally known in the working of rubber materials. Due to the right circular cylindrical configuration of the exterior surface of the tread for the tire 10, and in order to avoid permanently setting distortions into the tire 10, this invention comprehends that the curing of the body of tread material be accomplished by heating the tire carcass and body of tread material in an open steam pressure vessel such as that shown and described in United States Patent No. 2,271,855 rather than in the more conventional tightly closed mold vessel. In such an open vessel, the carcass of the tire 10 and the body of tread material built thereon are uniformly heated by exposure of both the tread face and the interior of the carcass to steam at elevated temperatures and pressures. As the result of this more uniform heating, as compared with conventional mold vulcanizing process, vulcanization can proceed at a lower temperature and while the tire is in a relaxed, rather than a strained, condition, thereby enhancing the wear characteristics of the cured tread and avoiding the introduction of unnecessary distortions.

More particularly, when cured in an open steam pressure vessel, a temperature of approximately 260° F. may be used, as contrasted with a temperature of approximately 295° F. required in conventional mold curing practices. It is known that, during vulcanization of rubber, two phenomena are occurring. The first is a cross-linking process wherein sulfur is becoming attached to rubber molecules and the second is chainsission wherein cleavage or cutting of the molecular chain occurs. With lower curing temperatures, chainsission proceeds at a slower rate than is true of higher temperatures, while cross-linking occurs normally. As a result, desirable physical properties of tensile strength, tear strength, abrasive wear resistance, and modulus of elasticity are derived without the impairment thereof by chainsission. Further, the curing process contemplated by the present invention avoids overcuring of the wear surface of the tread and the resultant surface chainsission, as can occur where heat is applied to the tire primarily from the tread face area.

In the drawings and specification, there have been set forth preferred embodiments of the invention, and although specific terms are employed, they are used in a generic and descriptive sense only and not for purposes of limitation.

I claim:
1. A renewed heavy-duty tire adapted for mounting on a relatively low speed vehicle such as a loader and for operation on an abrasive, substantially level and solid surface such as a quarry floor comprising:
   a previously used tire carcass having sidewalls with reliefs therein indicative of the former presence of a lugged tread on the carcass, and
   a plurality of superposed layers of a uniform type of tread renewal material each having a width equal to the width of the exterior surface of said carcass between said sidewalls, said layers cooperating in providing a body of tread renewal material entirely encircling and intimately adhered to said tire carcass in the area defined between said sidewalls and having a smooth exterior surface of substantially right circular cylindrical configuration free from both projecting portions and grooves in said body and edges scalloped in conruency with said sidewall reliefs of said carcass, said body further being of predetermined substantially uniform thickness throughout and providing a tread having a large footprint area for imparting to the tire favorable abrasive wear and cut damage resistance characteristics while obtaining a large bonding area between previously cured and renewed cured tread material.

References Cited

UNITED STATES PATENTS

| | | | |
|---|---|---|---|
| 2,228,212 | 1/1941 | Heintz | 152—187 |
| 1,917,261 | 7/1933 | Hawkinson | 152—209 |
| 2,459,757 | 1/1949 | Smith | 152—187 |
| 2,542,871 | 2/1951 | Johnson | 152—209 |
| 2,689,200 | 9/1954 | Johnson | 152—209 |
| 2,697,472 | 12/1954 | Hawkinson | 152—187 |
| 3,136,673 | 6/1964 | Carver | 156—129 |

FOREIGN PATENTS

| | | |
|---|---|---|
| 239,310 | 1/1946 | Switzerland. |
| 521,174 | 1/1956 | Canada. |

ARTHUR L. LA POINT, Primary Examiner

C. B. LYON, Assistant Examiner

U.S. Cl. X.R.

152—330